United States Patent [19]

Zhou et al.

[11] Patent Number: 5,781,584
[45] Date of Patent: Jul. 14, 1998

[54] CODE ACQUISITION AND TRACKING CIRCUIT USING SWITCHED MATCHED FILTER AND SLIDING CORRELATORS

[75] Inventors: Changming Zhou; Guoliang Shou; Makoto Yamamoto; Sunao Takatori, all of Tokyo, Japan

[73] Assignees: Yozan Inc., Tokyo; Sharp Kabushiki Kaisha, Osaka, both of Japan

[21] Appl. No.: 689,143

[22] Filed: Jul. 30, 1996

[30] Foreign Application Priority Data

Jul. 31, 1995 [JP] Japan .................. 7-215389

[51] Int. Cl.[6] .................................................. H04B 1/707
[52] U.S. Cl. ................. 375/207; 375/208; 375/343; 455/343
[58] Field of Search ......................... 375/206, 207, 375/208, 209, 210, 343; 455/230, 231, 343; 364/724.11

[56] References Cited

U.S. PATENT DOCUMENTS

| | | | |
|---|---|---|---|
| 5,193,212 | 3/1993 | Son | 455/38.3 |
| 5,241,568 | 8/1993 | Fernandez et al. | 375/368 |
| 5,376,975 | 12/1994 | Romero et al. | 340/825.44 |
| 5,381,133 | 1/1995 | Erhart et al. | 340/825.44 |
| 5,388,063 | 2/1995 | Takatori | 364/724.17 |
| 5,396,446 | 3/1995 | Shou | 364/825 |
| 5,438,701 | 8/1995 | Yamada et al. | 455/89 |
| 5,500,810 | 3/1996 | Shou | 364/724.011 |
| 5,502,664 | 3/1996 | Shou | 364/724.16 |
| 5,563,812 | 10/1996 | Shou | 364/606 |
| 5,638,362 | 6/1997 | Dohi et al. | 370/342 |

OTHER PUBLICATIONS

Simon et al., Spread Spectrum Communications Handbook, McGraw-Hill, Inc., 1994, p766 and P818.
Dixon, Robert, Spread Spectrum System with Commercial Applications, Third Edition, John Wiley & Sons, Inc., 1994, p237 and p259.
Yokoyama, Mitsuo, Spread Spectrum Communications System, Kagaku Gijutu Shuppansha, 1988, p301 (Title translated by applicant).

Primary Examiner—Stephen Chin
Assistant Examiner—Jeffrey W. Gluck
Attorney, Agent, or Firm—Cushman Darby & Cushman IP Group of Pillsbury Madison & Sutro LLP

[57] ABSTRACT

A filter circuit largely reducing electric power consumption compared with a conventional one, as well as realizing the initial acquisition in high enough speed. In a filter circuit according to the present invention, a matched filter and a sliding correlator are used in parallel; the first acquisition and holding is executed by a matched filter, a correlating operation is executed by a sliding correlator and a voltage supply to the matched filter is stopped.

4 Claims, 4 Drawing Sheets

CODE ACQUISITION AND TRACKING CIRCUIT USING SWITCHED MATCHED FILTER AND SLIDING CORRELATORS

FIELD OF THE INVENTION

The present invention relates to a filter circuit, especially to a filter circuit effective for a spread spectrum communication system for mobile cellular radio and wireless LAN.

BACKGROUND OF THE INVENTION

A matched filter is a filter for judging the identity between two signals. In spread spectrum communication, each user who receives a transmitted signals processes the received signal by a matched filter using a spreading code allocated for the user so as to find a correlation peak for acquisition and tracking.

Here, assuming that a spreading code is d(i), a sampling interval is Δt, a length of spreading code is N, and a received signal before a time t is x(t−i Δt), then a correlation output y(t) of matched filter is as in formula (1). In formula (1), d(i) is a data string of 1 bit data.

$$y(t) = \sum_{i=0}^{n-1} d(i)x(t - i\Delta t) \quad (1)$$

Using a matched filter, the size of a circuit became large because many multiplications must be performed. In order to find an acquisition and holding, double sampling or higher order of sampling for acquisition became necessary, but the size of the circuit also became larger to execute it. Therefore, a matched filter consumes much electric power, which is a defect. Especially it is a serious defect for mobile radio communication systems. A sliding correlator is also known, which sequentially multiplies the spread code by a multiplier. The sliding correlator took rather a long time to find the first acquisition.

SUMMARY OF THE INVENTION

The present invention solves the conventional problems and has an object to provide a filter circuit which reduces its electric power consumption compared with a conventional one, as well as realizing the first acquisition in high enough speed.

In a filter circuit according to the present invention, a matched filter and a sliding correlator are used in parallel, the first acquisition and holding is executed by a matched filter, a correlating operation is executed by a sliding correlator and a switch to stop the voltage supply to the matched filter.

It is possible to control to minimize the electric power consumption and to make the first acquisition in high speed by the filter circuit according to the present invention.

PREFERRED EMBODIMENT OF THE PRESENT INVENTION

Hereinafter a filter circuit of the present invention is described with reference to the attached drawings.

Figure 1:
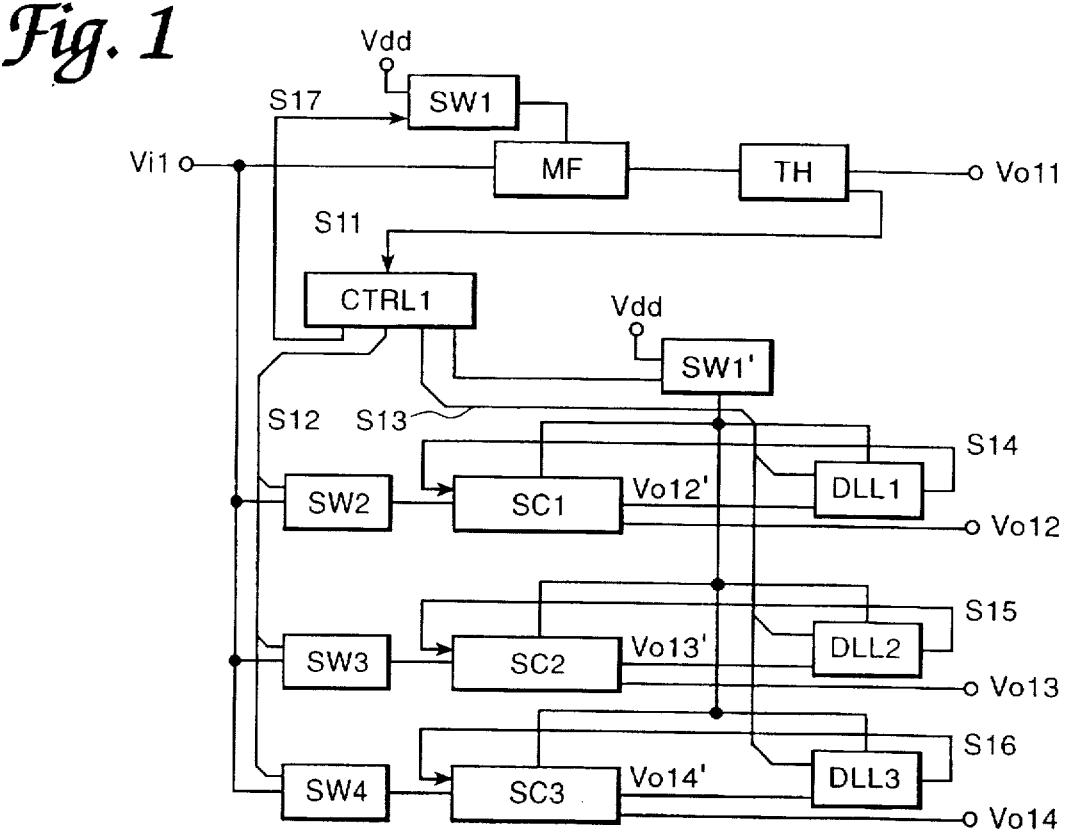
FIG. 1 shows a first embodiment of a filter circuit of the present invention.

In FIG. 1, the filter circuit includes a matched filter MF connected to an input signal Vil, and a peak detecting circuit TH which is connected to an output of the matched filter MF. The peak detector finds a plurality of timings on which an output of the matched filter exceeds a predetermined level, and outputs a signal showing the timing. The timing of the peak is a signal of the receiving terminal and timing to receive the delay signal. The step is repeated as many times as a number equal to or less than the number of sliding correlations.

An input signal Vil is input to the switches of three systems SW2, SW3 and SW4, and then to sliding correlators of three systems, SC1, SC2 and SC3. DLL (Delay Locked Loop) circuits as time trackers DLL1, DLL2 and DLL3 are connected to the following stages of sliding correlators from SC1 to SC3. The feedback signals (S14, S15 and S16 in FIG. 1) are input to the sliding correlators.

An output signal S11 of the peak detecting circuit TH is input to a controller CTRL1, and the timings of the sliding correlators from SC1 to SC3 are settled by the controller. The controller turns on and off the switches from SW2 to SW4 by a control signal S12, and the basic timings of DLL1 to DLL3 are settled by a control signal S13.

The basic timing settlement gives an off-set of d(i+j Δt) to d(i) in order to adapt to the relationship between a spread code d(i) and x(t−i Δt).

Figure 2:
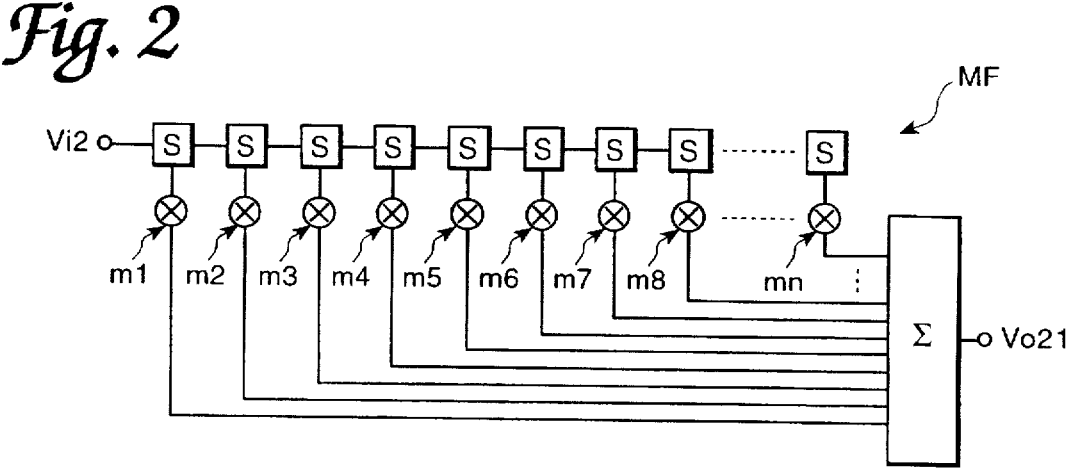
FIG. 2 shows a circuit of a matched filter in the first embodiment.

As shown in FIG. 2, the matched filter MF includes a plurality of serial sampling and holding circuits S and multipliers (shown by "x" in FIG. 2) multiplying by ml to mn the outputs of the sampling and holding circuits. The sum of the outputs of the multipliers is calculated by the adder (shown by "Σ" in FIG. 2). Though a matched filter consumes a large amount of electric power because of numerous sampling and holding circuits, multipliers and adders, the amount of the electric power consumption can be reduced by a power switch SW1 controlled by a signal S17 from the controller CTRL1 (see FIG. 1). As shown in FIG. 1, the supply voltage VDD of the matched filter is supplied through supply voltage switch SWI (shown as a representative of a plurality of supply voltage switches).

The sliding correlator and the DLL circuits get their supply voltage through supply voltage switch SW1' (shown as a representative of a plurality of supply voltage switches). When the matched filter is working for the first acquisition, the supply voltage switch is opened. The electric power consumption on the first acquisition can be reduced and electric power consumption of the whole circuit is at the minimum.

When the peak is detected in the outputs of the matched filter and signal S11 showing the basic timing is output from the peak detector, the controller CTRL1 outputs signal S17 to open the supply voltage switch SW1. That is, the matched filter is used with respect to the first acquisition, and higher speed processing is realized than using just a sliding correlator; then, the matched filter is stopped after the first acquisition is completed. Therefore, electric power consumption after the acquisition is reduced. At the same time that SW1 is opened, SW1', SW2, SW3 and SW4 are closed and cause to start input signals to SC1 to SC3 and to process signal.

Figure 3:
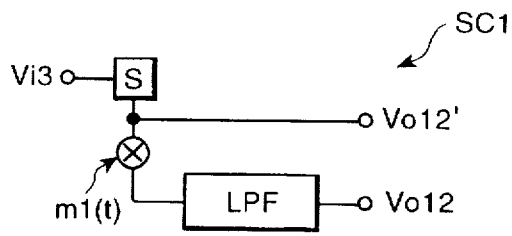
FIG. 3 shows a circuit of a sliding correlator in the first embodiment.

As shown FIG. 3, a sliding correlator SC1 holds input signal Vi3 received from a switch SW2 in a sampling and holding circuit S and inputs it to a multiplication portion (shown by "×"). The multiplication portion multiplies the input signal by a multiplier mi(t) supplied from DLL1, and inputs it to a low-pass filter LPF which is an accumulator. In the LPF, one cycle (period of multiplications with all spreading codes) of integration of multiplication results is performed, and the integrated result is output as signal Vo12. The multiplier is shown as a function of time, differently from the matched filter, in order to show a subtle settlement of time in DLL1 as described below. The input signal (a signal before a multiplication is performed) becomes an input signal Vo12' for DLL1 on the timing of the multiplication after being held once. The structures of sliding correlators SC2 and SC3 are the same as that of SC1 above. Since the structures from DLL1 to DLL3 are the same, DLL1 is described below and others are omitted.

Figure 4:
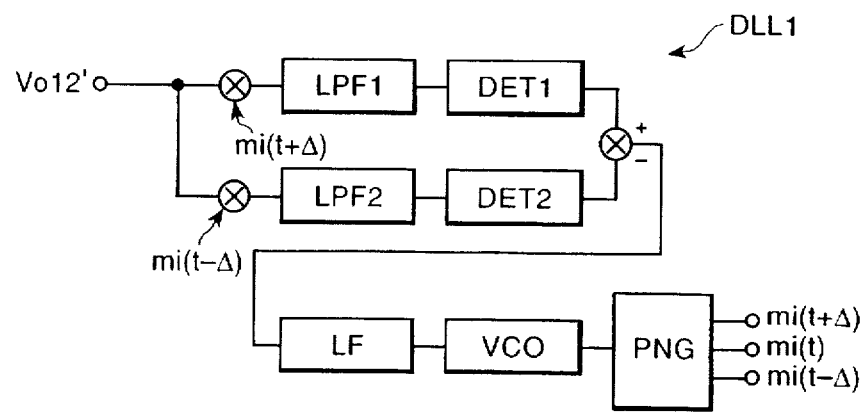
FIG. 4 shows a DLL circuit in the first embodiment.

In FIG. 4, DLL1 includes multipliers (shown with "×") each receiving, in parallel, a signal Vo12'. The outputs of the multipliers are input to low-pass filters LPF1 and LPF2. The structure of the multipliers is identical to the operational part of the sliding correlator. The multipliers perform a correlation calculation of a signal subtly delayed or advanced relative to mi(t). Outputs of LPF1 and LPF2 are input to square-law detectors DET1 and DET2, respectively. The difference of outputs of square detectors is calculated by an adder (shown by "+"). The difference signal is smoothed by a loop filter LF for noise reduction, and input to voltage control oscillation VCO. VCO performs phase control of PNG of spreading code generator as the last step, and generates signals mi(t) for providing SC1, mi(t−Δ), mi(t) delayed by a time Δ, and mi(t+Δ),mi(t) advanced by a time Δ. These advanced and delayed signals are input to the multiplier, and the delay and advance can be always monitored.

As above, the size of the circuit of a sliding correlator and a time tracker for sampling and holding and multiplication is smaller, and their electricity consumption is less than that of matched filter. The shift of synchronisity can be followed by the time tracker. In establishing a new communication, acquisition by the matched filter starts again.

In FIG. 1, one switch of supply voltage is shown with respect to whole of the matched filter. The number of supply voltages is to be decided by considering the electricity capacity. For example, in FIG. 2, one supply voltage should be provided for each sampling and holding circuit and for each multiplication circuit.

Figure 5:
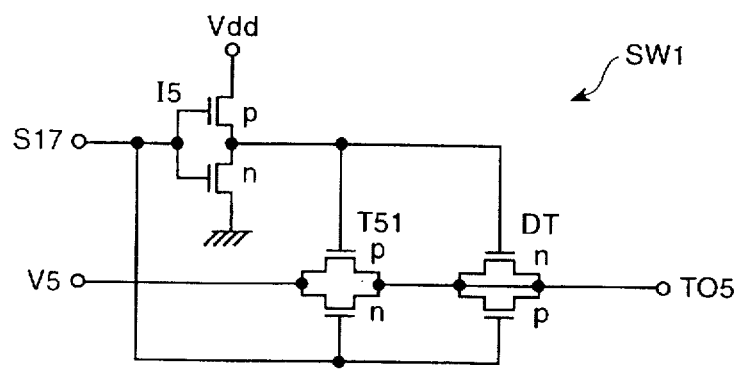
FIG. 5 shows a circuit of supply voltage.

FIG. 5 shows an example of a supply voltage switch SW1. An input voltage V5 is connected to the drain of a transistor circuit T51 for alternatively connecting the drain and the source of a pair of MOS transistors of n-type and p-type. The source of T51 is connected to an output terminal To5 through a dummy transistor with a similar structure with the source T51. S17 is input to the gate of nMOS transistor of the transistor circuit T51, and the inverted signal of S17 by an inverter 15 is input to a gate of pMOS transistor. When S17 is a high level, T51 is conductive, and when it is a low level, T51 is not conductive. Such a switch itself consumes very low electric power, and it has little influence on the electric power consumption of the whole circuit.

Here, a matched filter which further reduce electric power consumption is described.

Figure 6:
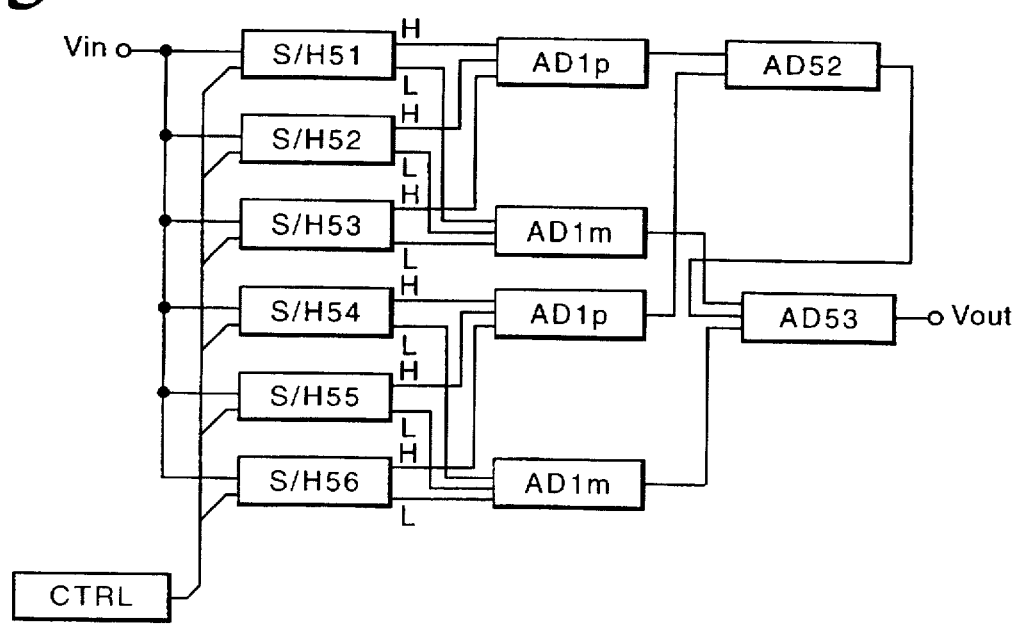
FIG. 6 shows a circuit of another matched filter.

In FIG. 6, which illustrates another embodiment of a matched filter circuit, input voltage Vin is connected in parallel to a plurality of sampling and holding circuits from S/H51 to S/H56. Two types of outputs, H(high) and L(low), are generated from each sampling and holding circuit. A control circuit CTRL is connected to each sampling and holding circuit in order to control that Vin is input to one of the sampling and holding circuits.

According to the control of the control circuit, the sampling and holding circuit receives an input voltage Vin, either of a H or a L, and a reference voltage Vr. The route is selected corresponding to 1 bit sign to be multiplied by the input signal. The multiplication is completed in this step.

Figure 7:
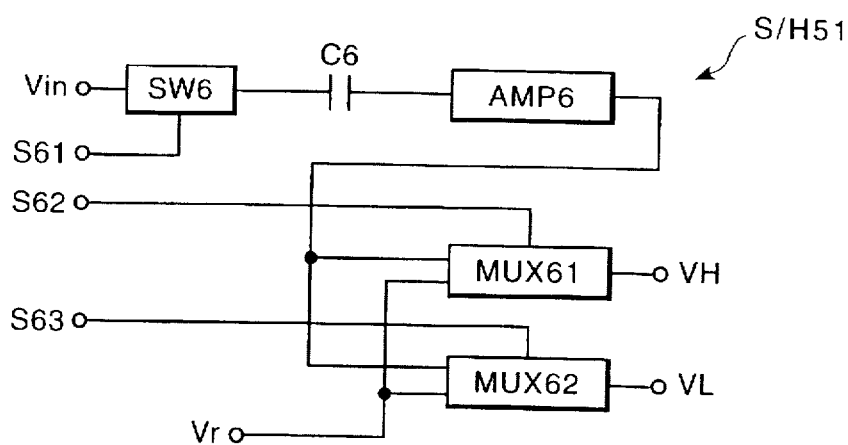
FIG. 7 shows a sampling and holding circuit in the matched filter in FIG. 6.

Sampling and holding circuits from S/H51 to S/H56 are structured as depicted in FIG. 7 (S/H51 represents them in FIG. 7), in which an input voltage Vin is connected to a switch SW6 which is similar to SW1. An output of the switch SW6 is connected to a capacitance C6 whose output is connected with an inverted amplifying portion AMP6.

Figure 10:
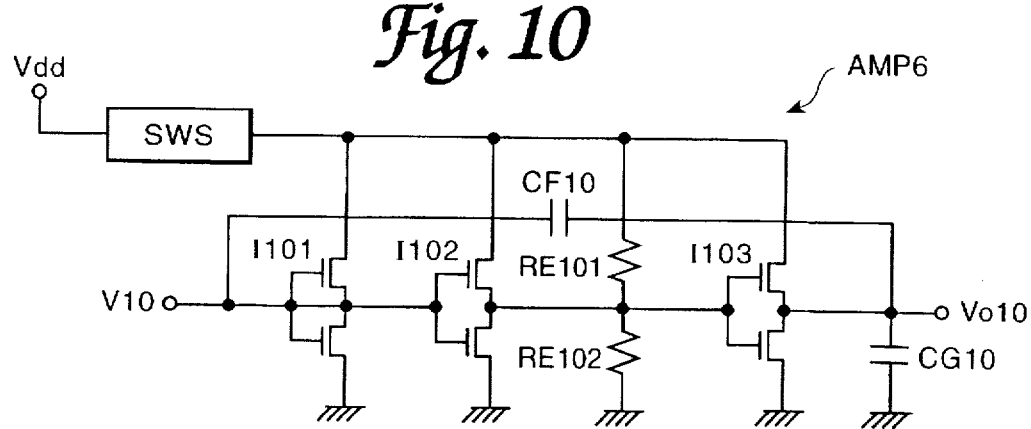
FIG. 10 shows a circuit of an inverted amplifying portion in the matched filter in FIG. 6.

In FIG. 10, which illustrates an inverted amplifying portion AMP6, an input voltage V10 is input to three serial stages of MOS inverters I101, I102 and I103. An output Vo10 of the last stage MOS inverter I103 is connected to an input of the first capacitance I101 through a feedback capacitance CF10, consequently, a closed loop gain is formed. The capacity of the feedback capacitance CF10 is settled to be equal to the total capacity of the capacitive coupling connected to the input of CF10 or that of connecting capacitance. The closed loop gain is settled as −1.

In the inverted amplifying portion AMP6, an output of I103 is connected to the ground through a grounded capacitance CG10, and an output of I102 is connected to a voltage supply and ground through a pair of balancing resistance RE101 and RE102. Unstable oscillation of the amplifying circuit is prevented by the feedback line. As resistance RE101 and inverters form I101 to I103 are connected to the supply voltage through a voltage supply switch SWS structured by well-known analog switch, the electric power consumption is reduced by opening the supply voltage switch when AMP6 is not utilized.

An output of AMP6 is input to two multiplexers MUX61 and MUX62 to which a common reference voltage Vr is connected (see FIG. 7). When SW6 is closed, C6 is charged by the electrical charge corresponding Vin, and the linearity of output is guaranteed by the feedback function of AMP6. When the switch SW6 is opened after that, the-sampling and holding circuit S/H51 holds Vin.

The switch SW6, multiplexers MUX61 and MUX62 are controlled by controlled by control signals S61, S62 and S63. S61 once closes the switch SW6 and then, opens the SW6 on the timing for inputting an input voltage. S62 and S63 signals are reversed to each other. When one of the multiplexers outputs Vin, the other outputs Vr. The MUX61 generates an output of a H(high) and the MUX62 generates an output of a L(low). The H and L correspond to spreading codes "1" and "−1", respectively. When "1" is multiplied by an input voltage, Vin is output from MUX61, and when "−1" is multiplied, Vin is output from MUX62.

Figure 8:
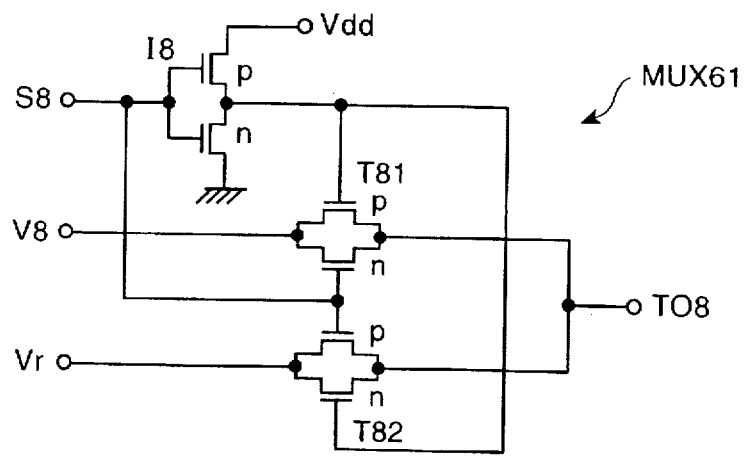
FIG. 8 shows a circuit of a multiplexer in the matched filter in FIG. 6.

In FIG. 8. the multiplexer MUX61 includes transistor circuits T81 and T82 in which a pair of transistors of pMOS and nMOS are connected to each other. An input voltage V8 and the reference voltage Vr are connected to the drains of T81 and T82, respectively. A signal S8 is input to the gate of nMOS and an inverted signal of S8 by an inverter I8 is input to the gate of pMOS of the transistor circuit T81. S8 is input to the gate of pMOS and the inverted signal is input to the gate of nMOS of the transistor circuit T82. The sources of T81 and T82 are connected to a common output terminal To8. When S8 is high, V8 is output from To8, and when it is low, Vr is output from To8 in the multiplexer above.

The signal S62 corresponds to the spreading code. When S62=1, 1x Vin=Vin is output to AD1p. At the same time, S63 is −1, and an output Vr corresponding to 0 is output to AD1m. When S62=−1, Vr corresponding to 0 is output AD1p. At this time, S63 is+1, and an output 1x Vin=vin is output to AD1m. The spreading code is constant for one set of input signals at a timing. On the timing to input a new signal, a new signal is input instead of the oldest signal. At the input, the relationship between circuits S/H51 to S/H56 and the data d(i) is shifted, therefore, control circuit shifts d(i) relative to the sampling and holding circuits. If the code sequence for S/H51 to S/H56 is not shifted, a signal (data) between (S/H)s is transmitted and an error is caused on the transmission. That is, it is effective to shift a code to prevent an error in the overall reception process.

The accumulation in the formula (1) is executed by the addition portions AD1p, AD1m, AD52 and AD53, in which output voltage VH and VL of each sampling and holding circuit are accumulated in AD53 and AD52, respectively. These accumulations are not directly executed. Dividing the circuits from S/H51 to S/H56 into a plurality of groups, the outputs VH and VL are once accumulated in AD1p and AD1m in each group. All the outputs of AD1p for accumulating VH are input to AD52, and all the outputs of AD1m for accumulating VL are input to AD53. In FIG. 6, six (S/H)s from 51 to 56 are shown, which are divided into two groups.

Figure 9:
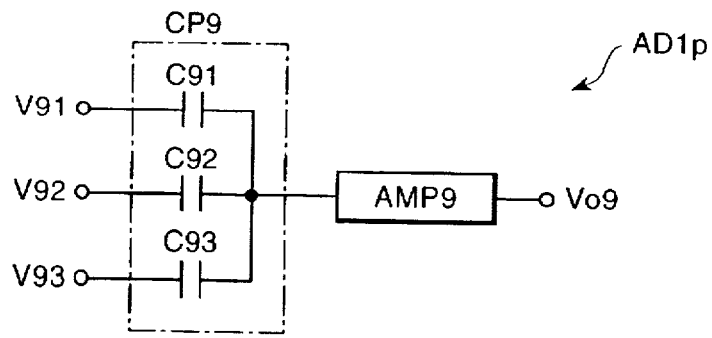
FIG. 9 shows the first addition circuit in the matched filter in FIG. 6.

As shown in FIG. 9, addition portion AD1p (AD1m is the same) includes a capacitive coupling CP9 with capacitances C91, C92 and C93 corresponding to the number of sampling and holding circuit. A normalized addition is performed in CP9. The output of CP9 is connected to AMP9 which is the same as AMP6, and is output as an output voltage Vo9 with good linearity.

Figure 11:
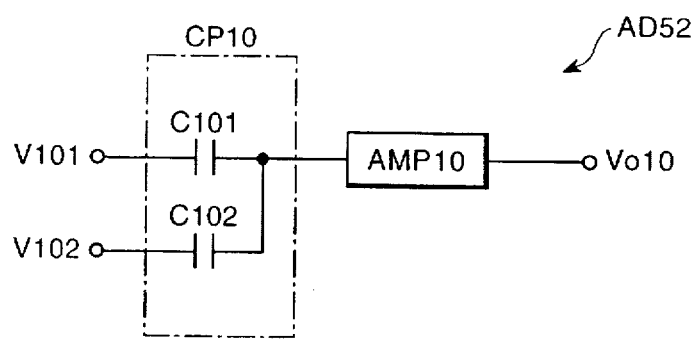
FIG. 11 shows a circuit of the second addition circuit in the matched filter in FIG. 6.

As in FIG. 11, the addition portion AD52 includes capacitive coupling CP10 having capacitances C101 and C102 corresponding to AD1p and AD1m connected to them. An output of normalized addition of AD52 is connected to inverted amplifying portion AMP10 similar to AMP6. An output of CP10 is generated in the output of AMP10 with good linearity. Here it is settled that V101 and V102 are the voltages relative to a basis of the reference voltage Vr, and C101=C102=CF10/2.

Figure 12:
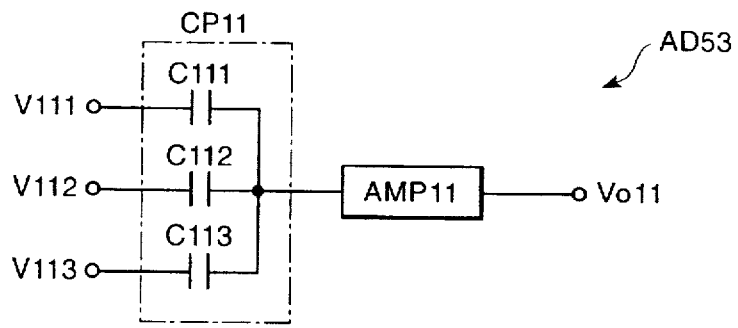
FIG. 12 shows a circuit of the third addition circuit in the matched filter in FIG. 6.

As in FIG. 12, addition portion AD53 includes a capacitive coupling CP11 having capcitances C111, C112 and C113 corresponding to addition portions AD1p or AD1m and AD52. An output of AD53 is connected to an inverted amplifying portion AMP11 similar to AMP6. An output of normalized addition of CP11 is generated in the output of AMP11 with good linearity. Here it is defined that C111=C112=C113/2. The weight of C113 is settled as the twice of C111 and C112. It is for reducing influence of the normalization in AD52 (to be adjusted to unnormalized V111 and V112). The normalization above prevents the maximum voltage from exceeding the supply voltage.

Figure 13:
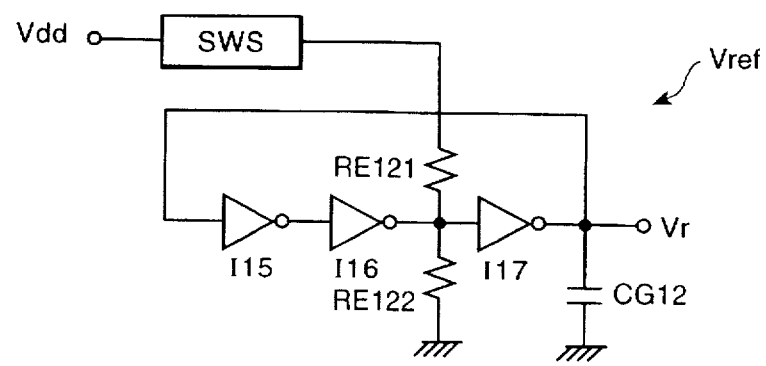
FIG. 13 shows a circuit of the reference voltage generating circuit in the matched filter in FIG. 6.

The reference voltage Vr is generated by a reference voltage generating circuit Vref in FIG. 13. The reference voltage generating circuit includes three stages of serial inverters I15, I16 and I17, and an output of the last stage is fed back to the first stage input. Similar to the addition portions, unstable oscillation is prevented by a grounded capacitance CG12 and balancing resistances RE121 and RE122. The output of the reference voltage circuit converges to a stable point on which an input and output voltages are equal to each other, and any reference voltage can be generated by changing the threshold of each inverter. Generally, in many cases, it is settled that Vr=Vdd/2 in order to keep the dynamic range large enough in both directions of plus and minus. Here, Vdd is the supply voltage of the MOS inverter.

Concerning to the matched filter circuit above, the size of the circuit is largely reduced compared with digital one, and processing speed is high because of parallel multiplication and addition. As the inputs and outputs of the sampling and holding circuit and addition portion are all voltage signals, and electric power consumption is low.

In a filter circuit according to the present invention, a matched filter and a sliding correlator are used in parallel, the first acquisition is executed by a matched filter, a correlating operation is executed by a sliding correlator and a voltage is stopped to supply t the matched filter. Therefore, it is possible to control electric power consumption to the minimum, and the first acquisition is high speed by the filter circuit according to the present invention.

What is claimed is:

1. A filter circuit comprising:
   i) a matched filter receiving an input signal;
   ii) a plurality of sliding correlators, each receiving said input signal;
   iii) a timing detecting circuit coupled to said matched filter and each of said sliding correlators, said timing detecting circuit detecting when an output of said matched filter reaches a predetermined level as many times as a number less than or equal to a number of said sliding correlators;
   iv) a controller coupled to said timing detecting circuit for setting a basic timing of a multiplication for each of said sliding correlators according to an output of said timing detecting circuit;
   v) a plurality of time trackers coupled to said controller, each of said time trackers being coupled to one of said sliding correlators and receiving said basic timing given by said controller, each of said time trackers adjusting said basic timing for said multiplication of said sliding correlator according to an output of said sliding correlator; and
   vi) a first voltage supply switch coupled to said matched filter for stopping operation of said matched filter after completion of said detection by said timing detecting circuit.

2. A filter circuit as claimed in claim 1, further comprising a second voltage supply switch for stopping operations of said sliding correlator and said time tracker during said operation of said matched filter.

3. A filter circuit for despreading a CDMA signal in a transmission system, said filter circuit comprising:
   (i) a matched filter multiplying an input signal by a spreading code sequence to generate one or more correlation peaks when said input signal had been spread by said spreading code sequence into said transmission system;

(ii) a plurality of sliding correlators receiving said input signal for despreading said input signal;

(iii) a timing detecting circuit coupled to said matched filter for selecting correlation peaks for each of said sliding correlators among said correlation peaks generated by said matched filter;

(iv) a controller connected to said timing detecting circuit and each of said sliding correlators for synchronizing each of said sliding correlators with one of said correlation peaks;

(vi) a plurality of tracking circuits coupled to said controller, each said tracking circuit being coupled to one of said sliding correlators and adjusting a corresponding one of said sliding correlators so as to synchronize said sliding correlator with said correlation peaks when said correlation peaks are shifted; and vii) a first power supply switch being connected to said matched filter for disconnecting said matched filter from an electrical power source when said matched filter is not active, whereby said electrical power for said matched filter is minimized.

4. A filter circuit as claimed in claim 3, further comprising a second power supply switch for disconnecting said sliding correlator and said tracking circuits from the electrical power source when said matched filter is active.

* * * * *